(12) United States Patent
Pursifull

(10) Patent No.: US 9,228,557 B1
(45) Date of Patent: Jan. 5, 2016

(54) METHOD AND SYSTEM FOR EXPEDITING ENGINE WARM-UP

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 14/327,335

(22) Filed: Jul. 9, 2014

(51) Int. Cl.
```
F02B 33/44   (2006.01)
F02N 19/02   (2010.01)
F01M 13/00   (2006.01)
F01N 11/00   (2006.01)
F01N 5/02    (2006.01)
F01N 13/08   (2010.01)
F02D 41/00   (2006.01)
```

(52) U.S. Cl.
CPC .............. *F02N 19/02* (2013.01); *F01M 13/00* (2013.01); *F01N 5/02* (2013.01); *F01N 11/00* (2013.01); *F01N 13/08* (2013.01); *F02D 41/0002* (2013.01); *F01M 2013/0038* (2013.01)

(58) Field of Classification Search
CPC .......... F02B 37/16; F02B 37/18; F02B 37/24; F02B 37/22; F02B 37/186; F02B 33/446; F02B 33/44; F02D 41/0007; F02D 23/00
USPC ................ 60/320, 321, 324, 602, 605.1, 611; 123/572, 573, 574, 543, 546, 41.86
See application file for complete search history.

(56) References Cited

U.S. PATENT DOCUMENTS

| | | | | |
|---|---|---|---|---|
| 1,540,144 A * | 6/1925 | Redmond | ......... | F02M 31/0805 123/545 |
| 2,797,674 A * | 7/1957 | Dolza | ......... | F01M 13/022 123/41.86 |
| 3,285,709 A * | 11/1966 | Eannarino | ......... | F01N 3/26 422/114 |
| 4,027,478 A * | 6/1977 | Masaki | ......... | F01N 3/18 60/285 |
| 4,079,715 A * | 3/1978 | Masaki | ......... | F01P 5/00 123/142.5 R |
| 4,534,333 A * | 8/1985 | Slattery | ......... | F02M 31/047 123/545 |
| 4,846,136 A * | 7/1989 | Phillips | ......... | F02B 61/045 123/556 |
| 7,316,226 B2 | 1/2008 | Callahan | | |
| 8,042,335 B2 * | 10/2011 | Pursifull | ......... | F01N 3/055 60/298 |
| 8,413,438 B2 | 4/2013 | Pursifull et al. | | |
| 2005/0016474 A1 | 1/2005 | Dopke et al. | | |
| 2010/0012103 A1 * | 1/2010 | Lewis | ......... | F02M 25/06 123/574 |
| 2011/0138774 A1 * | 6/2011 | Pursifull | ......... | F01N 3/055 60/273 |
| 2011/0138807 A1 * | 6/2011 | Ulrey | ......... | F01N 5/02 60/605.1 |

FOREIGN PATENT DOCUMENTS

JP              58165559 A  *   9/1983

OTHER PUBLICATIONS

Bidner, David K. et al., "Method for Preheating a Powertrain," U.S. Appl. No. 14/223,870, filed Mar. 24, 2014, 41 pages.
Ulrey, Joseph N. et al., "Method and System for Engine Control," U.S. Appl. No. 14/245,940, filed Apr. 4, 2014, 40 pages.
Ulrey, Joseph N. et al., "Method and System for Engine Control," U.S. Appl. No. 14/245,945 filed Apr. 4, 2014, 57 pages.
Ulrey, Joseph N. et al., "Method and System for Vacuum Generation," U.S. Appl. No. 14/266,411, filed Apr. 30, 2014, 41 pages.

* cited by examiner

*Primary Examiner* — Patrick Maines
(74) *Attorney, Agent, or Firm* — Julia Voutyras; Alleman Hall McCoy Russell & Tuttle LLP

(57) ABSTRACT

Methods and systems are provided for improving crankcase ventilation by directing heated air to a crankcase. Air is drawn into the crankcase upon passage through an interstitial space of a double walled exhaust manifold where it is heated. Crankcase vapors are then released to the engine intake, downstream of an intake throttle.

17 Claims, 8 Drawing Sheets

METHOD AND SYSTEM FOR EXPEDITING ENGINE WARM-UP

FIELD

The present invention relates to expediting engine warm-up through the use of heated positive crankcase ventilation.

BACKGROUND/SUMMARY

Under cold start conditions, a vehicle engine and powertrain may have cooled to ambient conditions. Consequently, each component of the engine and powertrain has to be warmed-up to a desired operating temperature. The time taken to overcome the lower powertrain temperature and reach an optimum operating temperature may be significantly large. While the engine warms up, there may be high friction within the engine due to a higher viscosity of engine fluids such as engine oil when they are relatively cold, and further, heat may be lost to engine coolant thereby reducing a thermal efficiency of the engine. Overall, these effects may lead to a lower fuel economy, an increase in engine wear, as well as an increase in exhaust emissions. Thus, accelerating an engine warm-up can provide various benefits.

Various approaches have been developed to expedite engine heating during an engine cold-start. For example, engine intake air may be heated via a dedicated heater. In still other approaches, fuel injection and/or ignition timing adjustments are used to expedite heating during start-up. The inventors herein have recognized that heat transfer to the engine internal components can be further improved by heating the fresh air entering the crankcase. In particular, this may allow for higher rates of heat transfer at low ambient temperatures. As such, various approaches have also been developed for heating crankcase gases. For example, intake air may be heated via a heating assembly coupled to the air induction system, such as shown in U.S. Pat. No. 2,797,674. As another example, as shown in US 20050016474, intake air may be delivered to a crankcase after passing through a heating box, the heating box warmed via radiant heat from engine cylinders and exhaust gas.

However, an issue with such approaches is the need for a dedicated heater, which can add component complexity and costs. In addition, the operation of the heater may lead to a fuel economy penalty. Further still, heating of the intake manifold air can worsen the engine's knock limit, and decrease the engines maximum power output. In systems relying on heat exchange via a coolant, the maximum coolant temperature may limit the amount of heat that can be transferred. In addition, the relatively slow warm-up of a coolant may limit the portion of a trip time that can be utilized to heat intake air or crankcase gases. Thus, heating the engine intake air may be substantially different from heating the air intentionally entering the crankcase. It is also different from heating the fittings through which the crankcase air passes as it leaves the crankcase (which is done for freeze avoidance).

In one example, some of the above issues may be at least partly addressed by a method for an engine, comprising drawing fresh air through an interstitial space of a double wall exhaust system to heat the air, and then directing the heated air to a crankcase. In this way, engine heating may be expedited.

As an example, an engine may include a double walled exhaust manifold that is configured as an exhaust-to-air heat exchanger. Fresh intake air (boosted or unboosted) is drawn, from upstream of an intake throttle, through an interstitial space of the double walled exhaust manifold to heat the air with exhaust heat. The heated air is then directed to a crankcase for positive crankcase ventilation (PCV). This allows heat to be transferred to engine internals. The transfer rate increases as the ambient temperature decreases, allowing for higher heat transfer at engine cold-start conditions. In other words, more heat is serendipitously transferred to a location suited for engine heating during conditions when rapid engine warming is most required. Crankcase vapors released from the crankcase are then received in the engine intake manifold, downstream of the intake throttle. A temperature of the crankcase vapors, however, may be lower than the temperature of the heated air entering the crankcase. For example, the crankcase vapors may be at the bulk temperature of the crankcase. In other words, heating the crankcase air does not lead to a corresponding increase in the temperature of crankcase vapors entering the engine. As a result, issues related to heating of the intake manifold air, such as worsening of a knock limit, or a decrease in the engines maximum power, are averted. The approach may also be used with crankcase ventilation systems that operate at largely constant flow rate to further improve blow-by gas oil separation.

In this way, the double wall exhaust manifold as described herein establishes a synergy in functionality, in that heated intake air can be drawn into the crankcase to expedite engine heat transfer precisely when engine heating is desired, without heating the crankcase gases delivered to the engine intake. By expediting engine heating during an engine cold-start, fuel economy, engine performance, and exhaust emissions improvements are achieved. As such, freezing of the crankcase effluent in the exit conduit can occur at cold ambient temperatures and can be exacerbated by cold, moist ventilation air entering the crankcase. Herein, by delivering heated air to a crankcase, the need to heat PCV fittings, to prevent icing, is reduced. As such, this leads to further improvements in fuel economy and improvements in PCV performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
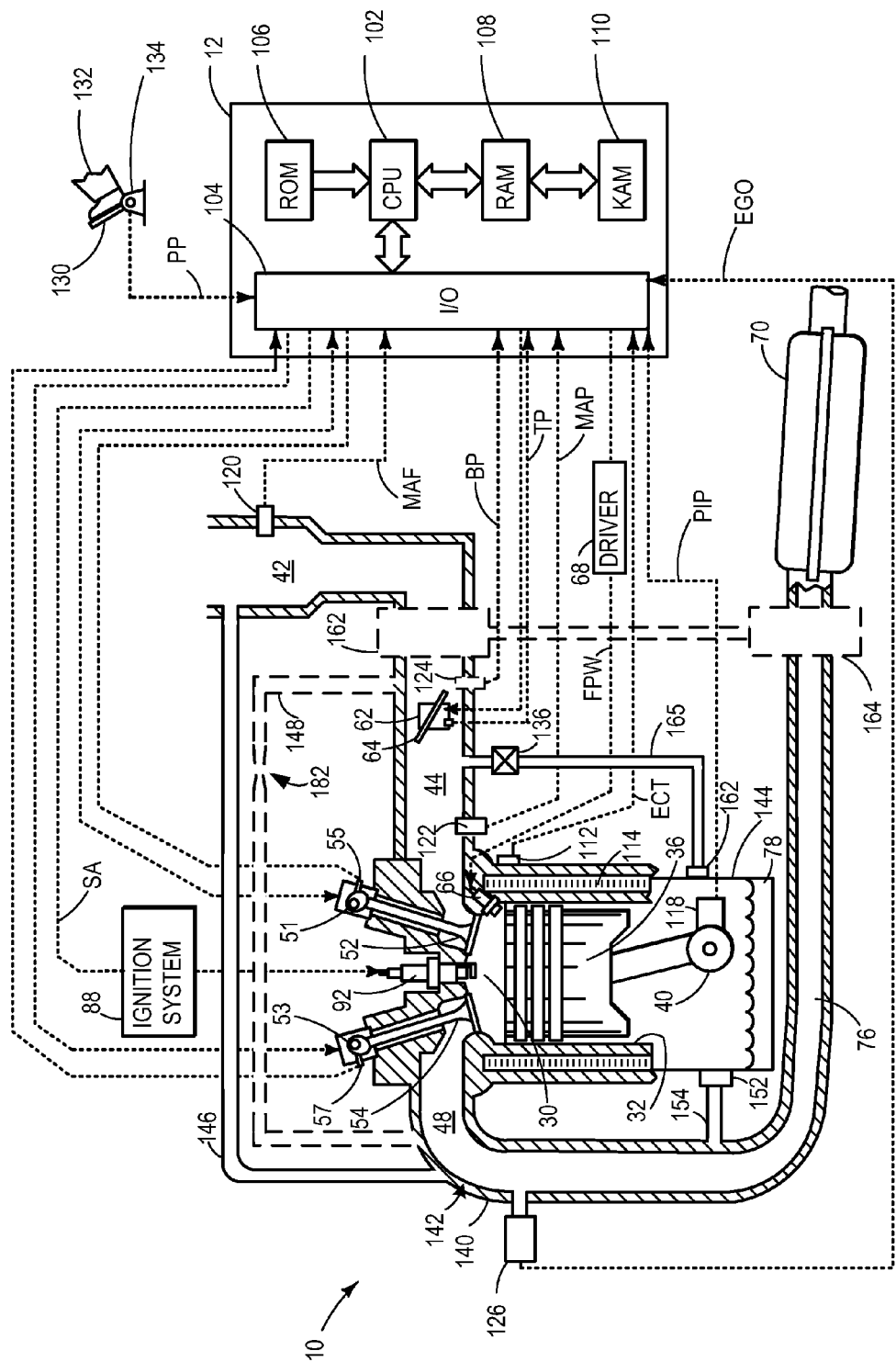
FIG. 1 shows a schematic diagram of an example engine in accordance with embodiments of the present disclosure.
Figure 3:
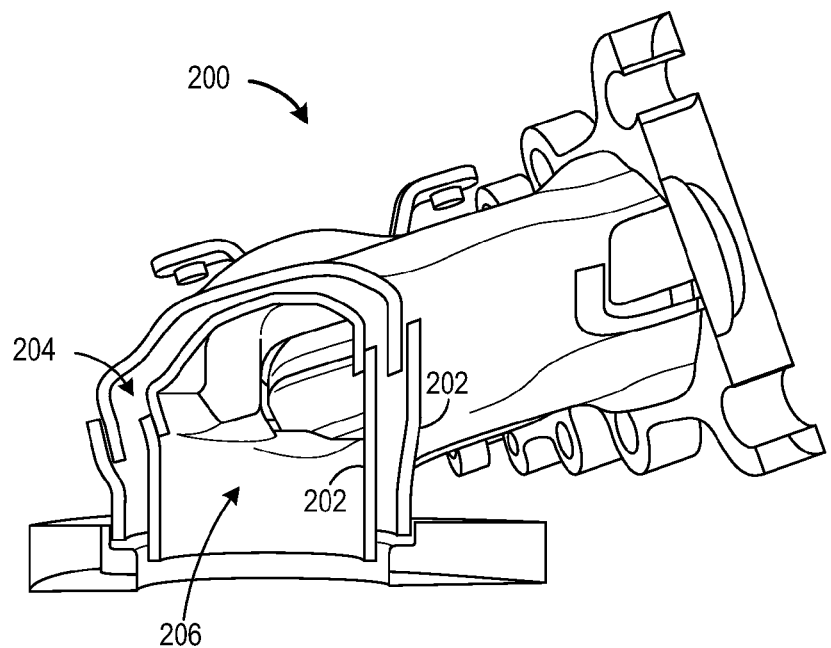
FIG. 3 shows a schematic depiction of a cross-section of the double wall exhaust manifold of FIG. 2.
Figure 4:
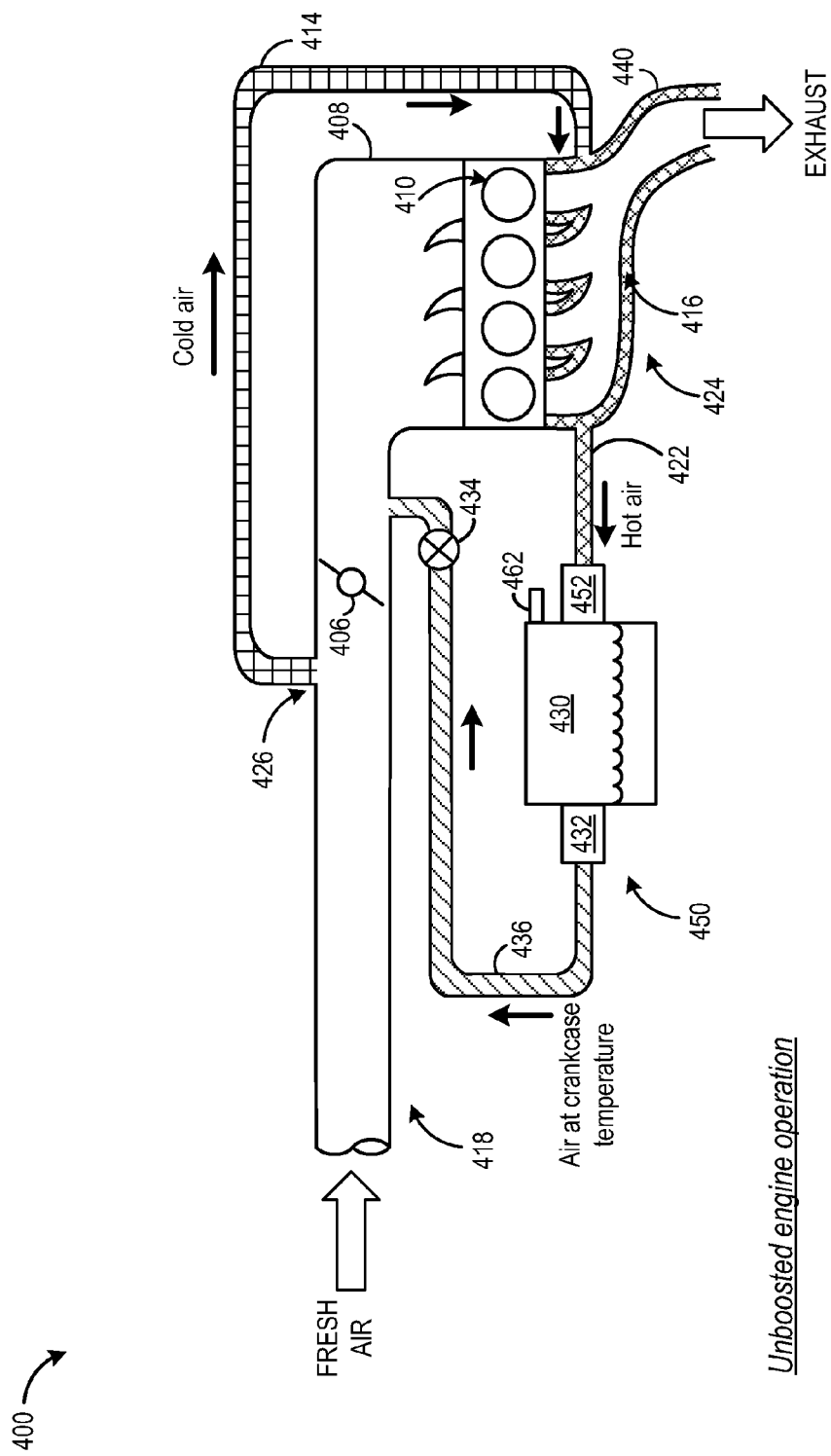
FIG. 4 represents a schematic depiction of heated air entering a crankcase via a double wall exhaust manifold in a naturally aspirated engine.

Methods and systems for heating a crankcase in an engine system, such as the engine system of FIG. 1, are described. Heat from exhaust gases may warm intake air as it is circulated through an interstitial space of a double wall exhaust system, such as the exhaust system shown in FIGS. 2-3. Intake air in a naturally aspirated engine may be drawn into the interstitial space from upstream of an intake throttle (FIG. 4). In a forced induction engine, intake air may be drawn from downstream of a compressor (FIG. 5) and upstream of the intake throttle into the interstitial space. Alternatively, intake air that is heated via the compressor may warm the crankcase (FIG. 6) without being heated via the interstitial space. A controller may be configured to perform a routine, such as the routine of FIG. 7, to flow intake air through the crankcase and adjust fuel injection and/or throttle position based on an amount of crankcase vapors flowing into the intake through a positive crankcase ventilation (PCV) valve. A mass flow rate of crankcase vapors through the PCV valve may increase as heat transfer to the engine increases (FIG. 8). Further, the controller may be configured to diagnose a dislocation of a tube delivering heated air to the crankcase based on crankcase temperature, as discussed at FIGS. 9-10.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber 30 (or cylinder 30) of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel (not shown) to enable a starting operation of engine 10. Crankshaft 40 is shown enclosed within crankcase 144 which also contains lubricating oil 78.

Combustion chamber 30 may receive intake air from intake manifold 44 via intake passage 42 and may exhaust combustion gases via exhaust manifold 48 and exhaust passage 76. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber (as depicted) or in the top of the combustion chamber (near the spark plug), for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 76 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 76 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; crankcase temperature from a temperature sensor coupled to the crankcase (not shown in FIG. 1); profile ignition pickup signal (PIP) from Hall effect sensor 118 (or other type) coupled to crankshaft 40; throttle position (TP) from a throttle position sensor; and absolute manifold pressure signal from sensor 122. Engine speed signal, RPM, may be generated by controller 12 from signal PIP. Manifold pressure signal MAP from a temperature manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed. Example methods are described with reference to FIGS. 7 and 9.

Engine 10 may optionally include a compression device such as a turbocharger or supercharger including at least a compressor 162 arranged along intake passage 42. For a turbocharger, compressor 162 may be at least partially driven by a turbine 164 (e.g. via a shaft) arranged along exhaust passage 76. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. Boost pressure sensor 124 may be coupled to intake passage 42 downstream of compressor 162 for providing signal BP to controller 12.

FIG. 1 further shows exhaust manifold 48 having a double wall exterior 140 defining an interstitial space 142 through which air may flow. The interstitial space may be manufactured similar to that of a liquid space. Further details of the double wall exhaust manifold are provided at the description of FIGS. 2-3. Conduit 146 is shown connecting the interstitial space 142 to the intake passage 42 upstream of throttle 62 and, if present, compressor 162. As such, intake air may be drawn from intake passage 42 via conduit 146 to interstitial space 142 where intake air may be heated via heat transfer from exhaust gases flowing through exhaust manifold 48. In the example of a boosted engine, a further conduit 148 may draw boosted intake air from downstream of compressor 162 and charge air cooler (not shown). Boosted intake air may then flow through aspirator 182 in conduit 148 before being directed into interstitial space 142. In some embodiments, boosted intake air drawn into conduit 148 may be delivered into conduit 146 wherefrom the boosted air may travel into the interstitial space of the exhaust manifold. Intake air entering the interstitial space may be heated via heat transfer across the exhaust manifold double wall. In both boosted and naturally aspirated embodiments, intake air heated via passage through interstitial space 142 may be directed into crankcase 144 via conduit 154 and oil separator 152. Crankcase 144 may also be fluidically coupled to intake manifold 44 via conduit 165 to allow crankcase vapors to exit the crankcase 144 and be ingested in the engine. Crankcase vapors may include blow-by gases from the cylinders which may be transferred to intake manifold 44 via positive crankcase ventilation (PCV) valve 136. Further, oil particles present in crankcase vapors may be selectively filtered via second oil separator 162 before crankcase vapors are delivered to intake manifold 44.

In this way, fresh air may be drawn from upstream of intake throttle 62 into interstitial space 142 of the double wall exhaust manifold 48 which serves as an exhaust-to-air heat exchanger. The heated intake air may be delivered to the crankcase for warm-up benefits. In particular, the crankcase can be heated to expedite heat transfer to engine internals without substantially heating the crankcase vapors released from the crankcase into the engine intake. By heating the crankcase, the need to heat PCV fittings so as to prevent icing is reduced. Exhaust manifold 48 may also be cooled during high load operation by routing intake air through interstitial space 142. Additional features and embodiments of the disclosure will be described further below in reference to FIGS. 4-6.

As described above, FIG. 1 shows only one cylinder of a multi-cylinder engine, and that each cylinder may similarly include its own set of intake/exhaust valves, fuel injector, spark plug, etc.

Figure 2:
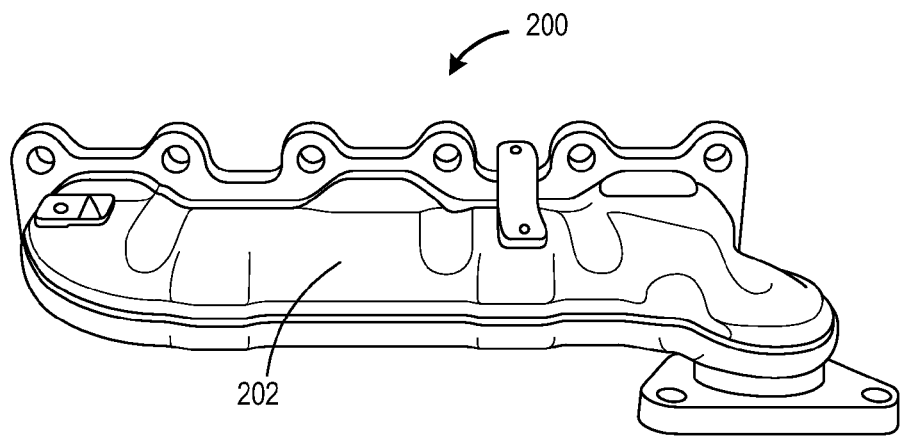
FIG. 2 portrays a schematic depiction of an example double wall exhaust manifold.

Turning now to FIG. 2, it shows an example exhaust manifold 200 having a double wall exterior 202. FIG. 3 shows a cross-section of the exhaust manifold 200 of FIG. 2, illustrating the interstitial space 204 of the double wall exterior through which intake air may flow. It should be appreciated that interstitial space 204 is distinct from the inner cavity 206 of exhaust manifold 200 through which exhaust gas may flow. Thus, intake air flowing through interstitial space 204 may be heated via heat transfer from hot exhaust gases flowing within inner cavity 206.

In this way, the engine system of FIGS. 1-3 enables a method for an engine wherein fresh air is drawn through an interstitial space of a double wall exhaust system to heat the air, and then the heated intake air is directed to a crankcase. Crankcase vapors released from the crankcase via the heated intake air are then directed into the intake manifold and ingested during engine operation.

Figure 5:
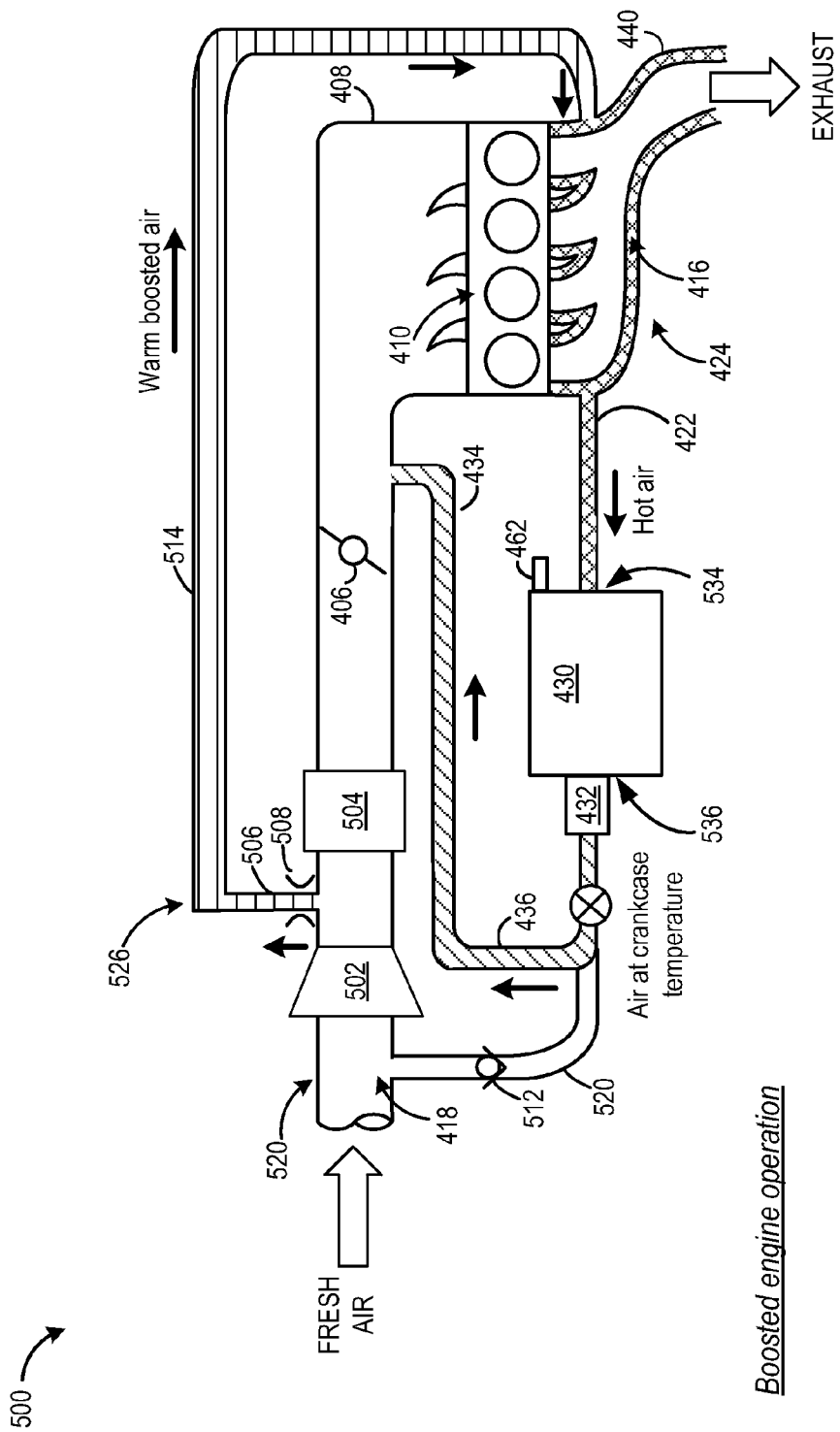
FIG. 5 shows a schematic depiction of boosted air being heated via the double wall exhaust manifold before entering the crankcase.
Figure 6:
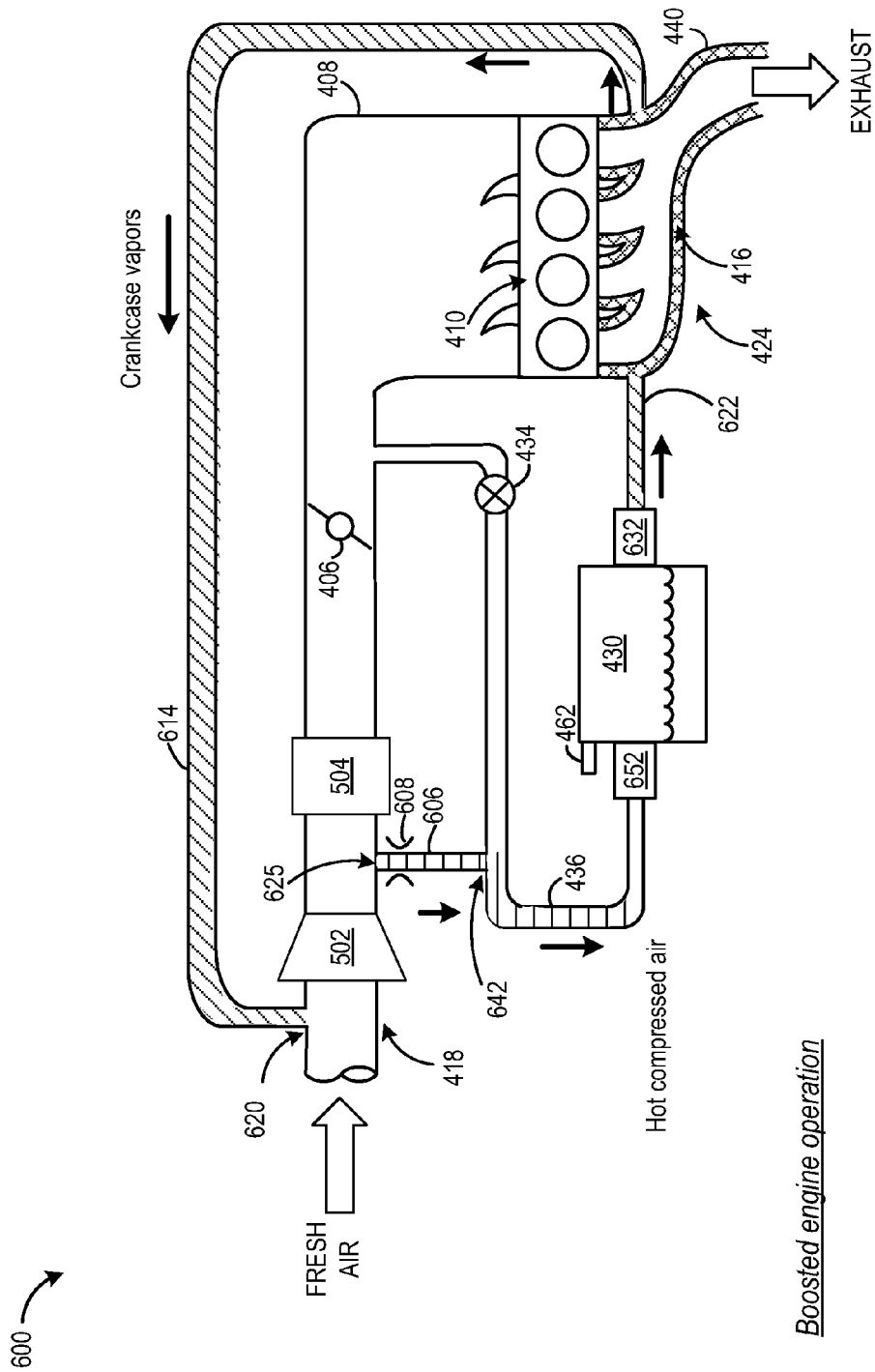
FIG. 6 shows a schematic illustration of heated, boosted air entering the crankcase.

FIGS. 4-6 portray different embodiments of crankcase warm-up using heated intake air. Specifically, FIG. 4 shows an example of crankcase warm-up in a naturally aspirated engine while FIGS. 5 and 6 show examples of crankcase warm-up in a boosted or forced induction engine comprising a turbocharger. Further, FIGS. 4 and 5 depict a unidirectional intake air flow path from the intake passage to the crankcase and thereon, into the intake manifold. In these examples, reverse flow of air into the intake passage upstream of throttle may occur or further plumbing actions could prevent reverse flow if that is deemed to be undesirable.

FIG. 4 illustrates an example of intake air heating via a double wall exhaust manifold 440 (shown as a cross-section) in an engine which does not comprise a boost device. In the depicted example, a larger portion of fresh intake air typically enters the intake passage 418 and is adjusted by intake throttle 406, based on engine operating conditions, before flowing into an intake manifold 408. The adjusted intake air is then fed from the intake manifold 408 into cylinders 410 for combustion with fuel. Exhaust gas from the combustion is then output to exhaust manifold 440. Exhaust manifold 440 is composed of a double wall exterior defining interstitial space 416, as elaborated previously at FIGS. 2-3.

A positive crankcase ventilation system (PCV) 450 is coupled to the engine intake manifold downstream of intake throttle 406 so that crankcase gases from crankcase 430 may be vented to the engine intake in a controlled manner. During normal engine operation, gases in cylinders 410 may escape past the pistons. These blow-by gases may include unburned fuel, combustion products, and air. Blow-by gases can dilute and contaminate oil, causing corrosion to engine components and contributing to sludge build-up, reducing the protective and lubricating properties of the oil. At higher engine speeds, blow-by gases can increase crankcase pressure such that oil leakage may occur from sealed engine surfaces. The PCV system 450 may help to vent and remove blow-by gases from the engine crankcase in a controlled manner in order to mitigate these harmful effects of blow-by gases and may combine them with an engine intake stream so that they may be combusted within the engine. By redirecting blow-by gases to the engine intake, the PCV system 450 aids in reducing engine emissions by precluding venting of blow-by gases to the atmosphere.

The PCV system 450 includes a PCV valve 434 positioned in conduit 436. PCV valve 434 may include a conventional PCV valve or a push-pull type PCV valve. Further, PCV valve may be a one-way valve ensuring unidirectional flow of crankcase gases from crankcase 430 to intake manifold 408. PCV valve 434 may be fluidly coupled via conduit 436 to crankcase 430 and fluidly coupled via conduit 436 to the engine intake manifold 408. The flow rate of crankcase gases through PCV valve 434 may vary with engine conditions such as engine speed, engine load, intake manifold vacuum, and crankcase temperature. Crankcase temperature may be monitored via temperature sensor 462 coupled to crankcase 430. PCV system 450 additionally comprises two oil separators 432 and 452 for separating oil vapors from blow-by gases. Oil separator 432 strips most of the oil from the gas stream when the crankcase air enters the engine via the intake manifold. Oil separator 452 strips most of the oil from the gas stream when the crankcase air enters the engine via the engine's intake passage 418. This flow path may be used less often and may be referred to as a stale air path, because no fresh air is intentionally introduced in this condition.

During an engine cold start, crankcase 430 may be heated by drawing a smaller portion of cooler fresh intake air (indicated by square hatch) into conduit 414 via opening 426 located upstream of throttle 406. The cooler intake air may flow through conduit 414 into interstitial space 416 where it may be heated by the surfaces of the double wall exhaust manifold 440 via heat transfer from exhaust gases, as indicated at 424. The heated crankcase fresh air (as indicated by cross hatch) may then flow into crankcase 430 through crankcase air delivery tube 422, the crankcase air delivery tube 422 being fluidically coupled to the first, upstream oil separator 452. In the crankcase, the heated crankcase fresh air may transfer heat to crankcase 430 and engine interiors expediting engine warm-up.

The amount of heat transferred to the crankcase, and thereby to the engine internals, may be based on a temperature difference between the crankcase and the intake air (which is a function of the ambient temperature) and further based on crankcase ventilation flow rate. Thus, the heat transfer rate may be higher at lower ambient temperatures, such as at an engine cold start. As an example, at a crankcase ventilation flow rate of 4 g/s and with a temperature difference of 200° C., the amount of heat added will be: 4 g/s×200° C.×1 J/gK=800 W. Since this heat is directly transferred to engine internals via the crankcase, engine warm-up during a cold-start is expedited. As shown at plot 802 of map 800 (at FIG. 8), as PCV flow rate increases, the amount of heat transferred to the crankcase and engine internals may also correspondingly increase.

The temperature of air entering the interstitial space of the exhaust manifold is lower than the temperature of air exiting the interstitial space of the exhaust manifold, and furthermore the temperature of crankcase vapors drawn from the crankcase (that is, exiting the crankcase) is lower than a temperature of the heated air entering the crankcase (that is, the heated crankcase fresh air). The temperature of crankcase vapors exiting the crankcase remain at the bulk temperature of the crankcase. This reduces issues associated with the unintentional heating of the intake manifold air, such as a decrease in maximum engine power and worsening of engine knock limit. As such, the knock limit is encountered at high load conditions when PCV fresh air flow ceases due to intake manifold vacuum nearing zero. Thus, just when this heated flow may have the potential to have a directionally negative effect, the heated flow ceases.

The heated crankcase fresh air is directed into the crankcase following which crankcase vapors are drawn from the crankcase (at crankcase temperature). The crankcase vapors are then directed into the intake manifold 408 via PCV valve 434. A second oil separator 432 may filter oil from intake air and vapors exiting crankcase 430 before they re-enter intake manifold 408. The flow rate of crankcase fresh air and crankcase vapors via PCV valve 434 may be controlled by engine vacuum. For example, at higher engine speeds and loads, when intake vacuum is higher (that is, manifold pressure is lower), the flow rate of crankcase vapors into conduit 414 and then via PCV valve 434 may increase.

Further, in the example of FIG. 4, crankcase fresh air may flow in only one direction. In particular, the unidirectional flow may include flowing air from the intake passage 418 upstream of throttle 406 through conduit 414, via interstitial space 416, through intake air delivery tube 422, and past upstream oil separator 452 into crankcase 430. The unidirectional flow may continue from crankcase 430 across downstream oil separator 432, through conduit 436, via PCV valve 430 into intake manifold 408 downstream of intake throttle 406. In other words, intake air may not flow from crankcase 430 via conduit 422 through interstitial space 416, within conduit 414 to enter intake passage 418 upstream of throttle 406. In some embodiments, due to the unidirectional flow, the need for an upstream oil separator 452 may be reduced, allowing for the elimination of oil separator 452. As such, this provides component reduction benefits.

As discussed above, intake air entering the naturally aspirated engine of FIG. 4 may be at ambient temperature and therefore, substantially cooler than exhaust temperature at a cold start. Thus, in an un-boosted engine, intake air entering interstitial space 416 may be cooler, and consequently, may be heated to a higher temperature via heat transfer from exhaust gases. A temperature of heated intake air eventually entering crankcase 430 via conduit 422 (herein also referred to as the crankcase fresh air) may be estimated by temperature sensor 462 which is coupled to crankcase 430 near the inlet side of the crankcase air delivery tube 422. As shown in FIG. 4, temperature sensor 462 may be coupled to the same side of the crankcase 430 as the side that crankcase air delivery tube 422 is attached. Conduit 422 may be configured as a tube in one example. In another example, conduit 422 may be a pipe. In alternate examples, temperature sensor 462 may be coupled in conduit 422 or in conduit 436. However, the temperature sensor may not be coupled inside crankcase 430.

As shown in FIG. 4, drawing fresh air into the crankcase includes drawing fresh air from upstream of the intake throttle. In comparison, drawing crankcase vapors into the intake manifold includes drawing crankcase vapors downstream of the intake throttle.

Turning now to FIGS. 5 and 6, they show examples of crankcase heating in an engine system including a boost device. Specifically, while in the boost condition, intake air is drawn into the crankcase from downstream of a compressor and upstream of an intake throttle, and directed to the crankcase for engine warm-up. Intake air drawn from downstream of the compressor may be heated during the compression within the compressor. Example embodiment 500 of FIG. 5 depicts heating the compressed, boosted air further via passage through an interstitial space of a double wall exhaust manifold before delivering the heated intake air to the crankcase. Example embodiment 600 of FIG. 6 may not include additional heating of the compressed, boosted air before directing the boosted intake air to the crankcase. As such, components previously introduced in FIG. 4 are numbered similarly in FIGS. 5 and 6, and not reintroduced.

In the example of FIG. 5 (embodiment 500), a larger portion of fresh intake air typically enters the intake passage 418 and flows across compressor 502 where it may be boosted to a higher pressure and may also be heated during compression. Subsequently, this boosted intake air may stream past charge air cooler 504 before being adjusted by intake throttle 406 and flowing into intake manifold 408.

A smaller portion of intake air may be drawn into conduit 514 from downstream of compressor 502 via a first passage 506. Orifice (or aspirator) 508 may be coupled to first passage 506 in order to control flow of boosted intake air from the high pressure location downstream of the compressor into the conduit 514. Thus, aspirator 508 may serve as a metering orifice. Further, a portion of intake air may be drawn into conduit 520 during boosted and un-boosted engine operating conditions. From conduit 520, the intake air may be mixed with crankcase vapors released from the crankcase, and delivered to the intake manifold, downstream of intake throttle 406.

Intake air drawn into conduit 514 from downstream of compressor 502 during boosted conditions may be heated via compression heating. Consequently, the temperature of intake air entering conduit 514 from downstream of the compressor (see warm boosted air indicated by diagonal hatch) may be warmer than ambient air temperature, as well as warmer than air entering conduit 514 from upstream of the compressor. Thus, intake air entering conduit 514 during an un-boosted engine operating condition may be cooler than intake air drawn in during a boosted engine operating condition.

Conduit 514 may conduct the warm boosted intake air to interstitial space 416 of the double wall exhaust manifold 440 wherein the warm intake air may be further heated via heat transfer from exhaust gases. The heated intake air (indicated by cross hatch) may then be directed to crankcase 430 via intake air delivery tube 422 entering crankcase 430 at side 534. Heat is transferred from the hot crankcase fresh air entering the crankcase to the crankcase and to engine internals directly, thereby expediting engine warm-up. After transferring heat to engine internals, the crankcase fresh air may exit crankcase 430 through oil separator 432. Crankcase vapors are then directed via conduit 436 and PCV valve 434 into intake manifold 408 at a location downstream of throttle 406. As in the example of FIG. 4, intake air may exit crankcase 430 at a lower temperature after transferring its heat to components within the crankcase. Thus, the temperature of crankcase flow exiting the crankcase may be lower than the temperature of heated air entering the crankcase. It will be noted that the crankcase in the example of FIG. 5 comprises a single, downstream oil separator 432. Herein, the unidirectional flow of intake air through the crankcase enables the use of a single oil separator 432 (unlike the example of FIG. 6) at the exit side 536 of crankcase 430. Intake air may flow in one direction from downstream of compressor 502 through conduit 514 and interstitial space 416, and via intake air delivery tube 422 into crankcase 430. Further, unidirectional flow may include intake air exiting crankcase 430 via oil separator 432 on exit side 536, through conduit 436 via PCV valve 434 and entering intake manifold 408 downstream of intake throttle.

Thus, similar to FIG. 4, intake air may not exit crankcase 430 from inlet side 534, through intake air delivery tube 422, past interstitial space 416 and into conduit 514. During boost, fresh air is pushed through 430 into the engine's inlet air duct. While un-boosted, crankcase vapors are pulled through the crankcase to the intake manifold. In this way, the system of FIG. 5 provides for unidirectional positive crankcase ventilation at all times, including during boosted and un-boosted conditions.

In this way, heated fresh air is drawn into a crankcase during an engine cold-start condition. Further, the fresh air is drawn into the crankcase during boosted and un-boosted engine operating conditions. By directing intake air into a crankcase upon passage through an interstitial space, the intake air can be heated via heat transfer across the exhaust manifold wall. By directing boosted intake air into the crankcase upon passage through an interstitial space, the intake air can be heated via compression heating as well as heat transfer across the exhaust manifold wall.

Turning now to FIG. 6, another example embodiment 600 of crankcase heating in a boosted engine system is depicted. Specifically, the crankcase is heated via hot, boosted intake air drawn in from downstream of the compressor and without additional heating of the boosted intake air via passage through the interstitial space of double wall exhaust manifold. In other words, hot boosted intake air drawn from downstream of a compressor is streamed directly into the crankcase.

In the depicted example, while a larger portion of intake air may flow past compressor 502, through charge air cooler 504, and across intake throttle 406 into intake manifold 408, a smaller portion of boosted intake air may be drawn from downstream of compressor to heat crankcase 430. The smaller portion of intake air may enter first passage 606 via opening 625 from downstream of compressor 502 and upstream of charge air cooler 504. The smaller portion of intake air may be at a boosted pressure and may also be at a higher temperature (as indicated by diagonal hatch) than ambient temperature due to compression heating. Therefore, aspirator 608 may be coupled to first passage 606 to provide metered air flow into passage 606 from the pressurized source. First passage 606 is fluidically coupled to conduit 436 which in turn fluidically couples the crankcase 430 via PCV valve 434 to intake manifold 408 at a location downstream of intake throttle 406.

Intake air entering first passage 606 may be metered via aspirator 608 and may flow across check valve 610 into conduit 436. At junction 642, the intake air may flow into conduit 436 towards crankcase 430 via a first oil separator 652. The hot intake air entering crankcase 430 via first oil separator 652 may transfer heat to the crankcase and engine internals, thereby expediting engine warm-up. Crankcase vapors released via the drawing in of hot intake air may then be directed past second oil separator 632 into conduit 622. From here, the crankcase vapors may be delivered to the intake passage 418 at location 620 upstream of the compressor via passage 614. The crankcase vapors may be directed to the compressor inlet upon passage through interstitial space 416 in double wall exhaust manifold 440. The crankcase vapors delivered to the compressor inlet may be at a lower temperature than the air entering the crankcase. In particular, when the air exits the crankcase, it is at crankcase temperature which is very close to oil temperature. This is because of the smaller flow rate (4 liters/second) of crankcase vapors going into a bigger volume (20 liters) of the intake passage, and thus the gas has a significant residence time as well as a labyrinth path.

During un-boosted conditions, crankcase fresh air may be drawn from upstream of throttle 406, and upstream of compressor 502 via passage 614. Herein, intake air is drawn, using intake manifold vacuum, into the interstitial space of the double wall exhaust manifold, and heated intake air is then delivered to the crankcase. Crankcase vapors, at bulk crankcase temperature, are then delivered to the engine intake, downstream of intake throttle 406 via conduit 436 and PCV valve 434. In this way, bidirectional flow of air between the intake manifold and the crankcase is enabled in the embodiment of FIG. 6. Oil separators 652 and 632 positioned on either side of crankcase 430 ensure oil separation from crankcase vapors during either direction of the bi-directional flow.

In this way, a crankcase along with engine components may be heated during an engine cold start. In the example of a naturally aspirated engine, intake air may be drawn from upstream of an intake throttle and heated air can be delivered to the crankcase upon passage through an interstitial space of a double wall exhaust manifold. In the example of a boosted engine, intake air may be drawn from upstream of an intake throttle and downstream of a compressor. By drawing intake air from downstream of the compressor, intake air heated via compression heating, and optionally further heated via passage through the interstitial space of double wall exhaust manifold is used to for heat transfer to crankcase components. By warming up a crankcase and transferring heat directly to engine internals requiring heat during an engine cold-start, engine warm-up can be expedited.

Heating the crankcase air via heat transfer from heated intake air may not result in a corresponding increase in temperature of crankcase vapors entering the intake manifold. Thus, the temperature of crankcase vapors may remain at bulk crankcase temperature, reducing the possibility of unintentional heating of the intake manifold. Accordingly, effects such as a reduction in engine power and a degraded knock limit may be avoided.

As mentioned earlier, a temperature sensor 462 coupled to crankcase 430 may be configured to measure the air temperature entering the crankcase. This sensor may allow a controller to confirm the receipt of heated intake air. As the amount of heated intake air received within the crankcase increases, the temperature of the air entering crankcase estimated by the temperature sensor may be higher. In addition, since intake air received via 422 is heated upon passage through the interstitial space, as the exhaust temperature increases, the temperature of intake air received via intake air delivery tube 422 also increases. An engine controller may thus predict an expected crankcase temperature (or its surrogate, engine oil temperature) based on the exhaust temperature and further based on the crankcase flow rate. As elaborated herein at FIG. 9, the engine controller may indicate dislocation of tube 422 based on a deviation of the estimated crankcase temperature from the expected crankcase temperature. For example, tube dislocation may be indicated based on a temperature of air entering the crankcase (as estimated by temperature sensor 462) being lower than an expected crankcase temperature (as estimated based on exhaust temperature). By identifying tube dislocation, venting of crankcase vapors to the atmosphere is reduced, improving engine emissions. An example detection of tube dislocation is described with reference to FIG. 10.

Figure 7:
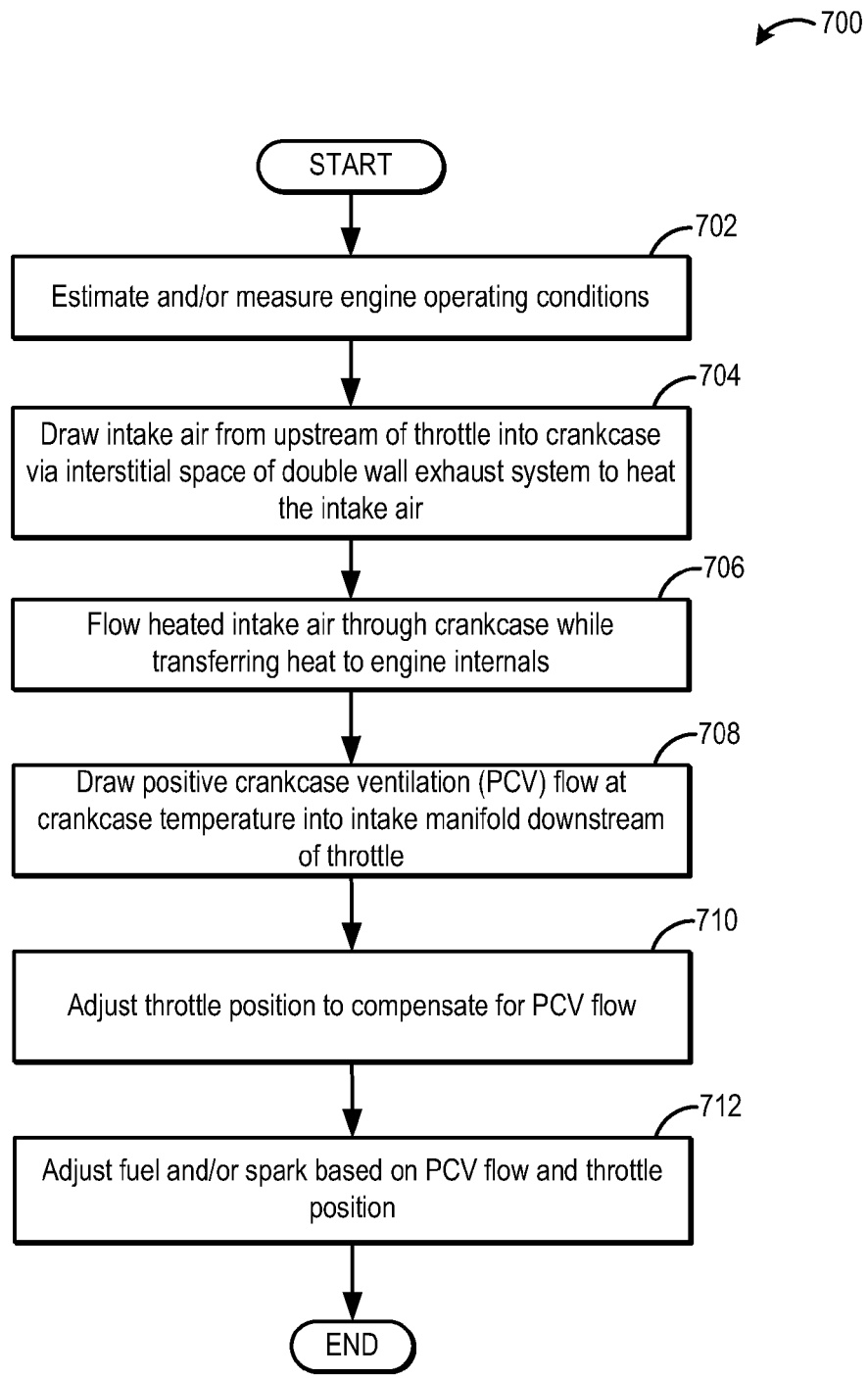
FIG. 7 illustrates a high level flow chart of a method of delivering heated intake air to a crankcase to expedite engine heating.
Figure 8:
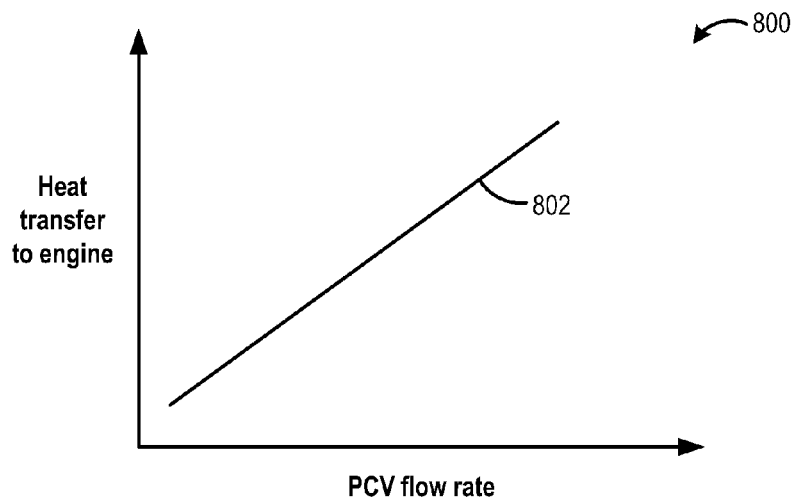
FIG. 8 shows an example relationship between PCV flow rate and heat transfer to the engine.

As also elaborated at FIG. 7, based on the hydrocarbon content of the crankcase vapors, fuel and/or air flow adjustments may be performed to maintain cylinder combustion air/fuel ratio. For example, the intake throttle position may be adjusted based on the crankcase vapors drawn into the intake manifold, the opening of the intake throttle decreased as the flow of crankcase vapors into the intake manifold increases. This allows combustion air/fuel ratio to be maintained, for example at stoichiometry, even as the crankcase is ventilated.

Turning now to FIG. 7, it shows an example routine 700 for heating a crankcase and engine internals while maintaining an engine combustion air/fuel ratio. Specifically, the routine enables heating of air drawn into a crankcase via passage through an interstitial space of a double walled exhaust manifold. The crankcase and engine internals may be warmed-up by flowing heated intake air. Then, crankcase vapors drawn using the heated air are directed into an intake manifold. Further, the intake throttle position may be adjusted based on an estimation of flow rate of crankcase vapors via the PCV valve into the intake manifold to maintain a combustion air/fuel ratio.

At 702, engine operating conditions may be estimated and/or measured. Example conditions such as operator torque demand, pedal position, engine speed, MAP, MAF, BP, boost level, etc., may be estimated. At 704, fresh intake air may be drawn from upstream of the intake throttle into a crankcase via passage through an interstitial space of a double walled exhaust manifold. While flowing through the interstitial space, the intake air may be heated via heat transfer with the exhaust manifold, the exhaust manifold heated due to flow of hot exhaust gases. In one example, drawing intake air from upstream of the intake throttle includes drawing fresh intake air at ambient conditions (temperature and pressure) into the crankcase, such as in the example of a naturally aspirated engine system at FIG. 4. In another example, drawing intake air from upstream of the intake throttle includes drawing boosted air from upstream of the throttle and downstream of a compressor into a crankcase, the boosted intake air heated at the compressor via compression heating. For example, as shown with reference to the boosted engine system of FIG. 5, drawing air includes drawing boosted, heated intake air from downstream of the compressor through an aspirator and past a check valve to be heated further within the interstitial space of the double wall exhaust system.

In yet another example, drawing intake air includes drawing hot boosted intake air directly into the crankcase, without passage through the interstitial space of the exhaust manifold. As shown with reference to the engine system of FIG. 6, this may include drawing hot, compressed air into the crankcase directly, from downstream of the compressor through an aspirator and past a check valve.

Next at 706, the heated intake air may flow into the crankcase while transferring heat to engine internals. In this way, engine warm-up is expedited, particularly during engine cold-start conditions. In the example of a naturally aspirated engine of FIG. 4 and the boosted engine of FIG. 5, the heated intake air may enter the crankcase via intake air delivery tube 422. In the example of the boosted engine of FIG. 6, the hot, compressed air may enter the crankcase via conduit 436. Depending on the level of boost, intake air entering the crankcase in the example of FIG. 6 may be cooler relative to heated intake air entering the crankcase from the interstitial space of the double wall exhaust manifold in the examples of FIGS. 4 and 5.

At 708, crankcase vapors may be drawn from the crankcase into the intake manifold. Crankcase vapors, at crankcase temperature, may flow past the PCV valve into the intake manifold downstream of the intake throttle. As mentioned earlier in reference to FIGS. 4-6, the temperature of crankcase vapors drawn from the crankcase may be lower than the temperature of the heated intake air. For example, the crankcase vapors may remain at bulk crankcase temperature.

Crankcase vapors may be drawn into the intake manifold based on engine operating conditions such as intake manifold vacuum level during un-boosted conditions and boost level during boosted conditions.

At 710, one or more engine actuators may be adjusted based on the crankcase flow so as to maintain combustion air-fuel ratio at or around stoichiometry even as the crankcase is ventilated to the intake manifold. For example, the intake throttle position may be adjusted to compensate for PCV flow. The PCV flow rate may be based upon engine speed and load. For example, as the flow of crankcase vapors into the intake manifold increases, an opening of the intake throttle may be decreased. Thus, in one example, when the engine oil temperature is higher, the hydrocarbon content of the PCV flow may be higher, and the fuel injectors may flow less fuel during hotter conditions than colder conditions. In another example, during an engine cold start, when engine oil temperature is lower, the hydrocarbon content of the PCV flow may be lower, and the fuel injectors may flow more during colder conditions than hotter conditions.

At 712, fuel injection and/or spark timing may be adjusted based on PCV flow and throttle position to provide engine speed control. For example, as exhaust temperatures increase and the hydrocarbon content of the PCV flow increases, fuel injection may be reduced. Spark timing may also be adjusted based on PCV flow and throttle position.

Figure 9:
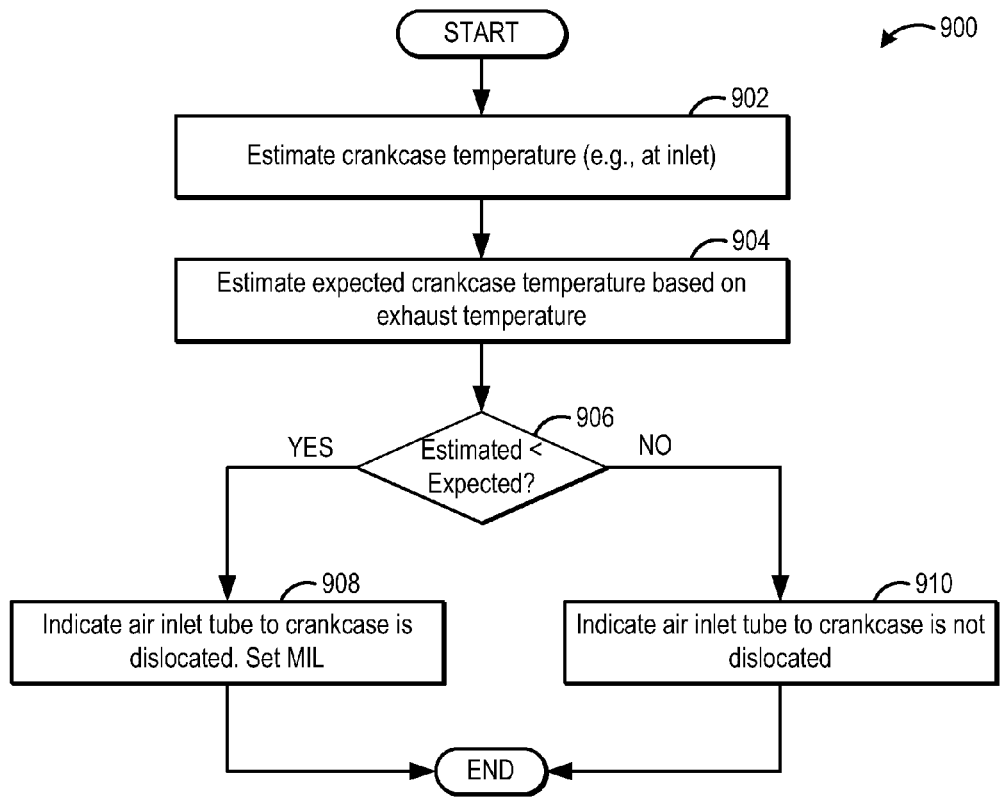
FIG. 9 illustrates a high level flowchart to diagnose uncoupling of an intake air delivery tube.

Turning now to FIG. 9, an example routine 900 for diagnosing dislocation of a tube delivering heated intake air to the crankcase is depicted. The dislocation of the delivery tube is based on a temperature of the heated air being lower than a threshold (or expected) temperature. As such, dislocation of the tube may cause crankcase vapors to be released into the atmosphere, resulting in increased emissions. Therefore, the position of the intake air delivery tube may be regularly monitored.

At 902, crankcase temperature may be estimated. In one example, the crankcase temperature may be sensed near the inlet of the crankcase where heated crankcase fresh air is received during unidirectional crankcase flow. If it is determined that the air entering the crankcase is not heated by the exhaust or by the compressor, it may be determined that the crankcase air delivery tube may be dislocated. The crankcase temperature may be estimated via a temperature sensor coupled to the crankcase, such as temperature sensor 462 of FIGS. 4-6. The temperature sensor may be coupled to the crankcase at a position close to the crankcase air delivery tube. In another example, the temperature sensor may be located at the crankcase inlet and on the crankcase side of any possible tube dislocation. At 904, an expected crankcase temperature may be determined based at least on exhaust temperature. For example, as the exhaust temperature increases and more heat is transferred from the exhaust manifold to intake air flowing through the interstitial space of the exhaust manifold, the crankcase temperature may be expected to proportionally increase. If the temperature sensor starts sensing crankcase fresh air that is not heated by the exhaust or by the compressor, it may be determined that something is amiss and that it is likely that the crankcase air delivery tube has become dislocated.

At 906, the expected crankcase temperature is compared to the estimated crankcase temperature to determine if the estimated value is lower than the expected value. In one example, it may be determined if the estimated crankcase temperature is lower than the expected crankcase temperature by more than a threshold amount. In one example, engine crankcase warm-up time may be monitored and used to diagnose tube dislocation. In another example, tube dislocation may be determined based on whether or not there is hot air entering the crankcase.

If the estimated crankcase temperature is not lower than the expected crankcase temperature, at 910 it may be determined that the crankcase air delivery tube is not dislocated. That is, the crankcase air delivery tube may be fluidically attached, as expected, to the oil separator at the crankcase inlet. Else, at 908, if the estimated crankcase temperature is lower than the expected crankcase temperature by more than the threshold amount, it may be indicated that the crankcase air delivery tube delivering intake air into the crankcase is dislocated. Additionally, a diagnostic code may be set to indicate the dislodgment and a malfunction indicator lamp (MIL) may be activated. Furthermore, in response to the indication of dislocation of crankcase air delivery tube, an engine boost pressure may be reduced. In particular, the controller may take various actions to mitigate the harm of certain tube disconnects. For example, in the system depicted at FIG. 5, if the tube is disconnected at oil separator 432, then preventing the engine from going into a boost condition would prevent significant discharge of crankcase gasses into the atmosphere. In this way, by comparing the temperature of intake air received at the crankcase from the interstitial space of a double walled exhaust manifold with an expected crankcase temperature, dislodgment of the intake air delivery tube can be detected.

Figure 10:
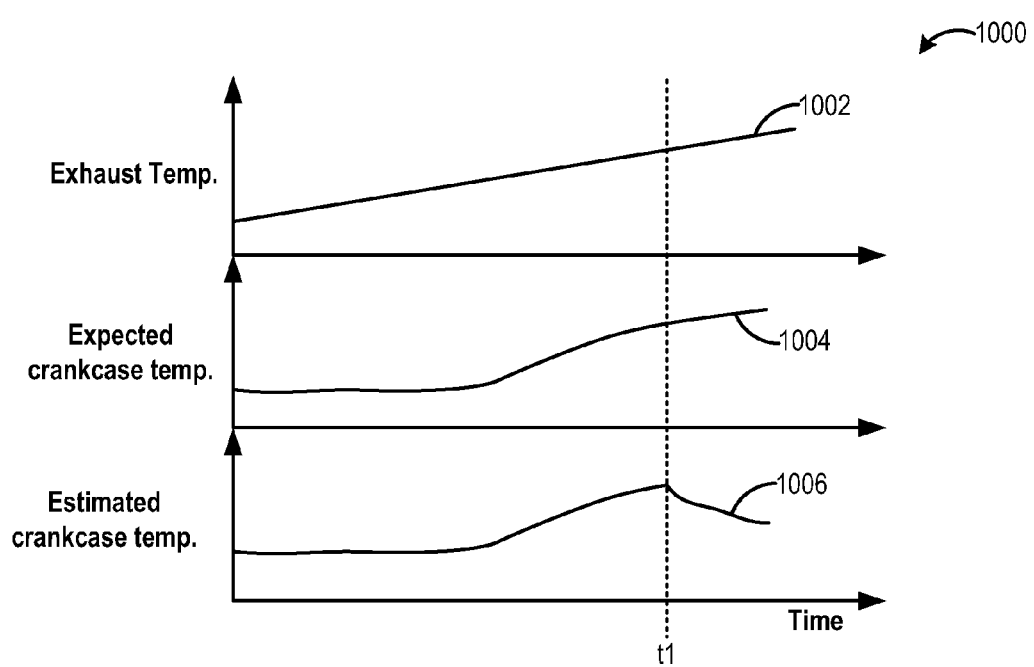
FIG. 10 illustrates an example detection of intake air delivery tube dislocation from the crankcase.

An example detection of tube dislocation is now described with reference to FIG. 10. Specifically, map 1000 depicts exhaust temperature at plot 1002, an expected crankcase temperature at plot 1004, and an estimated crankcase temperature at plot 1006.

At t1, an engine cold-start condition may exist. During the engine cold-start, the exhaust temperature may be low and the engine temperature may be low. During such conditions, to expedite engine heating, intake air is delivered to an engine crankcase upon passage through an interstitial space of a double walled exhaust manifold. Crankcase vapors are then ventilated to the intake manifold via a PCV valve. Thus, as the exhaust temperature rises with cylinder combustion during the restart, the temperature of the exhaust manifold may rise, allowing for more heat transfer to the intake air passing through the interstitial space of the exhaust manifold. The heated intake air is then delivered to the crankcase, allowing for direct heat transfer to the crankcase and the engine internals. Thus, as the exhaust temperature rises, and intake air is delivered to the crankcase via the interstitial space of the exhaust manifold, a temperature of the crankcase is expected to increase. In the depicted example, the expected crankcase temperature increases with increasing exhaust temperature after the exhaust temperature is higher than a threshold.

An actual crankcase temperature is estimated, and compared to the expected temperature during the flow of intake air and PCV ventilation. The temperature at the crankcase may be estimated by a temperature sensor coupled to an inlet of the crankcase. As such, while the crankcase receives the heated intake air, the estimated temperature may remain at or within a threshold of the expected temperature. At t1, a sudden drop in the estimated temperature is noted. In particular, the estimated temperature deviates from (falls below) the expected temperature by more than a threshold amount. In response to the deviation, at t1, it may be determined that the sudden cooling of the crankcase is due to the intake air tube delivering the heated intake air from the interstitial space of the exhaust manifold becoming dislocated from the crankcase inlet. As such, due to dislocation of the tube, crankcase vapors may be released to the atmosphere, degrading engine emissions.

Thus, in response to the detection of dislocation, an indication of tube dislocation is provided to the vehicle operator at t1. In this way, tube dislocation from the crankcase is rapidly detected during PCV ventilation and can be promptly addressed.

In one example, an engine system comprises an engine intake manifold; an intake throttle; a crankcase; a temperature sensor coupled to the crankcase for estimating a temperature of air received at a crankcase inlet; a boost device; and an exhaust system having a double wall exterior defining an interstitial space. The engine system further comprises a first conduit configured to draw air from the intake manifold, downstream of the boost device and upstream of the intake throttle, and deliver the air, upon passage through the interstitial space to the crankcase; a second conduit configured to deliver crankcase vapors from the crankcase to the intake manifold, downstream of the intake throttle; and a controller configured with computer readable instructions stored on non-transitory memory. The instructions may enable the engine system to draw intake air into the interstitial space from upstream of the intake throttle via the first conduit; heat the drawn intake air upon passage through the interstitial space; direct the heated air to the crankcase via the first conduit; and direct crankcase vapors drawn from the crankcase using the heated air to the intake manifold, downstream of the throttle, via the second conduit. The controller may include further instructions for indicating dislocation of the first conduit based on the temperature of air received at the crankcase inlet being lower than a threshold. Further, the controller may adjust a position of the intake throttle based on an amount and air-fuel ratio of crankcase vapors received via the second conduit, the air-fuel ratio estimated based on exhaust temperature. In some engine systems, the first conduit may further include a check valve to enable unidirectional flow of boosted or un-boosted air to the interstitial space.

In this way, engine warm-up may be expedited by delivering heated intake air into the crankcase. At the same time, crankcase vapors may be streamed into the intake manifold at crankcase temperature without heating the intake manifold. Therefore, problems such as reduction in engine power and reduction in knock limits may be averted. By accelerating engine warm-up, fuel economy benefits may be achieved and engine wear may be reduced. Further, exhaust emissions and engine performance may be improved. By flowing heated intake air into the crankcase, icing of PCV fittings may also be reduced enabling improved performance of the PCV system.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   drawing fresh air through an interstitial space of a double wall exhaust manifold to heat the air, and then directing the heated air to a crankcase via a tube, and
   indicating tube dislocation based on a temperature of the heated air entering the crankcase being lower than an expected crankcase temperature.

2. The method of claim 1, further comprising, drawing crankcase vapors from the crankcase into an intake manifold.

3. The method of claim 2, wherein a temperature of the crankcase vapors drawn from the crankcase is lower than a temperature of the heated air.

4. The method of claim 2, further comprising, drawing the fresh air from upstream of an intake throttle, and drawing the crankcase vapors downstream of the intake throttle.

5. The method of claim 4, further comprising, adjusting the intake throttle based on the crankcase vapors drawn into the intake manifold.

6. The method of claim 5, further comprising, decreasing an opening of the intake throttle as a flow of crankcase vapors into the intake manifold increases.

7. The method of claim 1, further comprising, drawing the fresh air during an engine cold-start condition.

8. The method of claim 1, further comprising, drawing the fresh air during boosted and un-boosted engine operating conditions.

9. A method for an engine, comprising:
   heating air via passage through an interstitial space of a double walled exhaust manifold;
   drawing the heated air into a crankcase via a tube,
   directing crankcase vapors drawn using the heated air to an intake manifold; and
   indicating tube dislocation based on a temperature of the heated air entering the crankcase being lower than an expected crankcase temperature.

10. The method of claim 9, wherein the air is drawn from upstream of an intake throttle and downstream of an intake compressor.

11. The method of claim 10, wherein the air is drawn during engine operation with boost and without boost.

12. The method of claim 9, further comprising, indicating dislocation of the tube in response to an estimated temperature of the heated air being lower than a threshold.

13. The method of 9, wherein the temperature of the heated air entering the crankcase is estimated by a temperature sensor coupled to the crankcase at an inlet side.

14. The method of claim 9, further comprising, in response to the indication of tube dislocation, reducing an engine boost pressure.

15. An engine system, comprising:
an engine intake manifold;
an intake throttle;
a crankcase;
a temperature sensor coupled to the crankcase for estimating a temperature of air received at a crankcase inlet;
compressor;
an exhaust manifold having a double wall exterior defining an interstitial space;
a first conduit configured to draw air from the intake manifold, downstream of the compressor and upstream of the intake throttle, and deliver the air, upon passage through the interstitial space to the crankcase, wherein said first conduit is a tube;
a second conduit configured to deliver crankcase vapors from the crankcase to the intake manifold, downstream of the intake throttle; and
a controller configured with computer readable instructions stored on non-transitory memory to:
draw intake air into the interstitial space from upstream of the intake throttle via the first conduit;
heat the drawn intake air upon passage through the interstitial space;
direct the heated air to the crankcase via the first conduit;
direct crankcase vapors drawn from the crankcase using the heated air to the intake manifold, downstream of the throttle, via the second conduit; and
indicate tube dislocation based on a temperature of the heated air entering the crankcase being lower than an expected crankcase temperature.

16. The system of claim 15, wherein the controller includes further instructions for:
adjusting a position of the intake throttle based on an amount and air-fuel ratio of crankcase vapors received via the second conduit, the air-fuel ratio estimated based on exhaust temperature.

17. The system of claim 15, wherein the first conduit includes a check valve to enable unidirectional flow of boosted or unboosted air to the interstitial space.

* * * * *